(No Model.)
A. J. KNIESSER.
MECHANISM FOR REVERSING ROTARY MOTION.
No. 329,318. Patented Oct. 27, 1885.
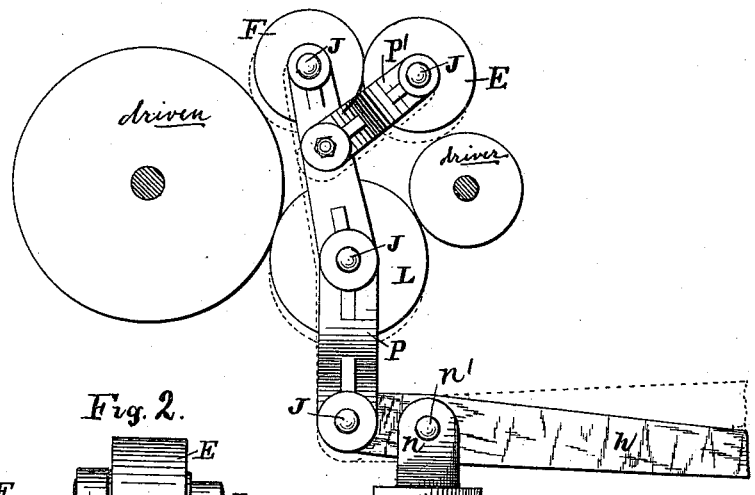
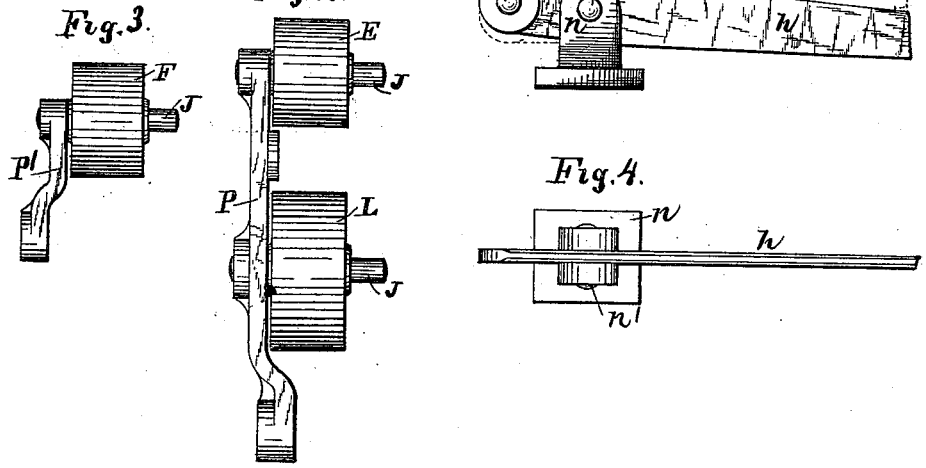
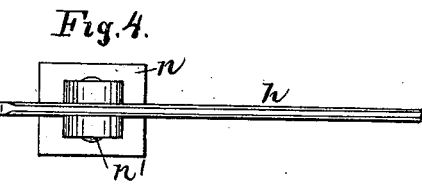

UNITED STATES PATENT OFFICE.

ADAM JULIS KNIESSER, OF TOLEDO, OHIO.

MECHANISM FOR REVERSING ROTARY MOTION.

SPECIFICATION forming part of Letters Patent No. 329,318, dated October 27, 1885.

Application filed May 11, 1885. Serial No. 165,157. (No model.)

*To all whom it may concern:*

Be it known that I, ADAM JULIS KNIESSER, a citizen of the United States, residing at Toledo, in the county of Lucas and State of Ohio, have invented a new and useful Mechanism for Reversing Rotary Motion, of which the following is a specification.

My invention relates to improvements in rotary-motion-reversing mechanisms, in which common paper friction-pulleys held in links facilitate the forward and backward rotary motion of the driven pulley; and the objects of my improvements are, first, to afford means of holding the friction-pulleys firmly in position and adjustably to each other as well as to the driving and driven pulleys; second, to provide a reversing mechanism of simplified and improved construction. I attain these objects by the mechanism illustrated in the accompanying drawings, in which—

Figure 1 is a side view of my whole invention. Fig. 2 is a detail view of a link for holding friction-pulleys. Fig. 3 is a detail view of an extra or compound link for holding a counteracting friction-pulley. Fig. 4 is a detail view of the reversing-lever and the fulcrum or support.

Similar letters refer to similar parts throughout the different views.

$h$ is the reversing-lever, and $n$ is its fulcrum. P is one of the side pieces which form the main link, Fig. 2, and holds the friction-pulleys L and F in position. P′, Fig. 3, is one of the side pieces which form the compound link for holding the friction-pulley E, Fig. 1, in proper relation with pulley F, said compound link being pivoted to the main link, as shown.

When the lever $h$ is thrown down, the friction-pulley L is brought into contact with the driving and driven pulleys. Thus by the intervention of said pulley L the reverse motion of the driver is communicated to the driven pulley. When the reversing-lever is thrown up, the pulley L is thereby released, and the pulleys E and F are brought in contact with each other and the driving and driven pulleys. Thus a reverse motion of the driving-pulley is obtained through the intervention of and by the counter-action with the extra or compound pulley E. The friction-pulleys run on the gudgeons J, which hold the side pieces of the links together, only one side piece of each link being shown in the views Figs. 2 and 3. The link Fig. 3 is attached to the link Fig. 2, as shown in Fig. 1, preferably by bolts or screws.

I am aware that prior to my invention various contrivances have been conceived and used for reversing rotary motion. I therefore do not claim the whole combination herewith set forth, broadly; but What I do claim, and desire to secure by Letters Patent, is—

The combination, with the reversing-lever $h$, support $n$, and friction-pulleys L, E, and F, of the main link and gudgeons J and the compound link attached oscillatively therewith, substantially as shown, and for the purpose specified.

ADAM JULIS KNIESSER.

Witnesses:
    CHARLES IRA SCOTT,
    EDWARD NICKLET.